Figure 1:
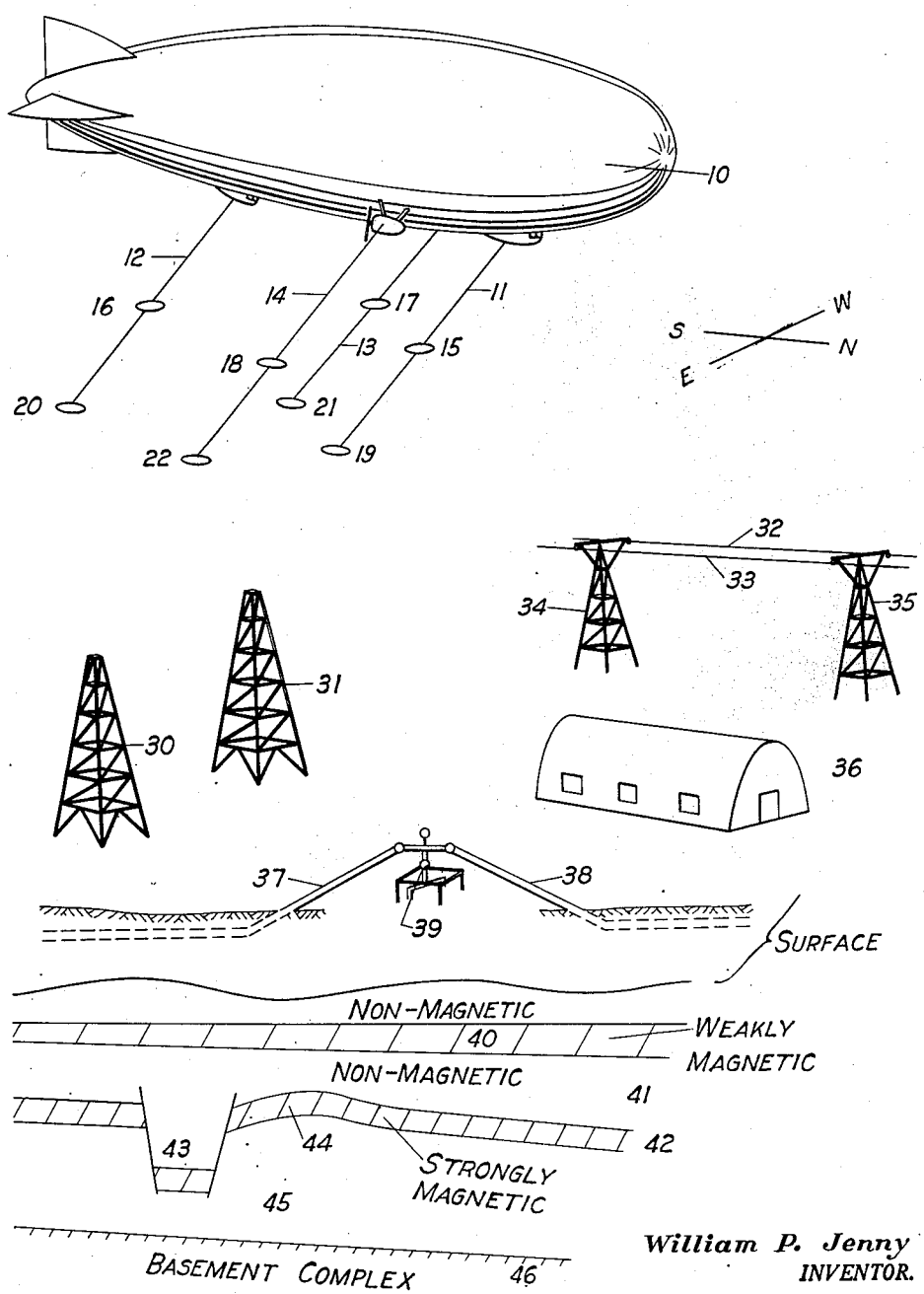

April 14, 1953 W. P. JENNY 2,635,134
SURFACE MICROMAGNETIC SURVEY METHOD
Filed Dec. 12, 1949 2 SHEETS—SHEET 1

William P. Jenny
INVENTOR.

BY Murray Robinson
ATTORNEY

William P. Jenny
INVENTOR.

BY Murray Robinson
ATTORNEY

Patented Apr. 14, 1953

2,635,134

UNITED STATES PATENT OFFICE 2,635,134

SURFACE MICROMAGNETIC SURVEY METHOD

William P. Jenny, Houston, Tex.

Application December 12, 1949, Serial No. 132,496

1 Claim. (Cl. 175—182)

This invention pertains to the surveying of the earth's magnetic field and more particularly to a survey of the field adjacent the earth's surface of sufficient accuracy to detect magnetic field anomalies indicative of local subsurface structures and faults constituting possible traps for petroleum fluids or associated with deposits of other substances or indicative of local ferrous deposits which may be of value in themselves or may be associated with other ores or minerals which are of value. A survey of the latter type conducted on or within a few hundred feet of the earth's surface and in which the errors in measurement are not more than a few gammas is termed a surface micromagnetic survey.

A surface micromagnetic survey is to be distinguished on the one hand from cruder surface surveys showing variations in the magnetic field intensity of the order only of twenty gammas or greater and on the other hand from highly accurate high altitude magnetic surveys. In both of the latter cases because of the small size of field variations due to local changes in the subsurface magnetic formations compared to the size of field variations measured such local changes are undetected and only variations due to regional changes are indicated by the survey.

It is already known to make surface micromagnetic surveys with instruments supported on the ground. Such surveys are limited in their usefulness because they are subject to the influences of artificial structures such as the steel framework of buildings, derricks, and pipes, and also of topographic effects, such as hills, canyons and large boulders, if the uppermost layer of the ground is magnetic. In addition, the information given by such a survey does not distinguish readily between surface field variations due to large changes occurring at great depth and small changes occurring near the surface. Furthermore, such surveys can be carried on only in such places and at such times as the terrain and weather conditions permit.

It is also known to make highly accurate high altitude surveys of the earth's magnetic field with an instrument carried by an airplane. Because in such case the instrument is carried at a high altitude the effects of local subsurface formation changes are almost completely submerged and only the field changes due to regional changes in the subsurface formations are apparent. The changes from region to region are slow so that the high speed of the airplane is well adapted to survey large areas in a short space of time. The information so gathered however is not the same as that gained from a surface micromagnetic survey, for small field variations due to changes in local formations are not detected.

It is an object of this invention to provide a method and apparatus for making a surface micromagnetic survey in which the influences of artificial structures and topographic effects are rendered negligible.

It is another object of this invention to provide such a method and apparatus which will yield information such that the influences of artificial structures and topographic effects can be separated from those due to changes in the earth's subsurface formation.

It is a further object of the invention to provide such a method and apparatus which will give information as to the depth of the formation in which exists the deposit, fault or structure causing any observed magnetic anomaly.

It is still another object of the invention to provide such a method and apparatus which can be used regardless of conditions of accessibility of points on the ground.

It is a further object of the invention to provide such a method and apparatus which can be used safely and without danger to the operator.

It is still another object of the invention to provide an apparatus and method for measuring the total and all components of the earth's magnetic field gradient.

Figure 2:
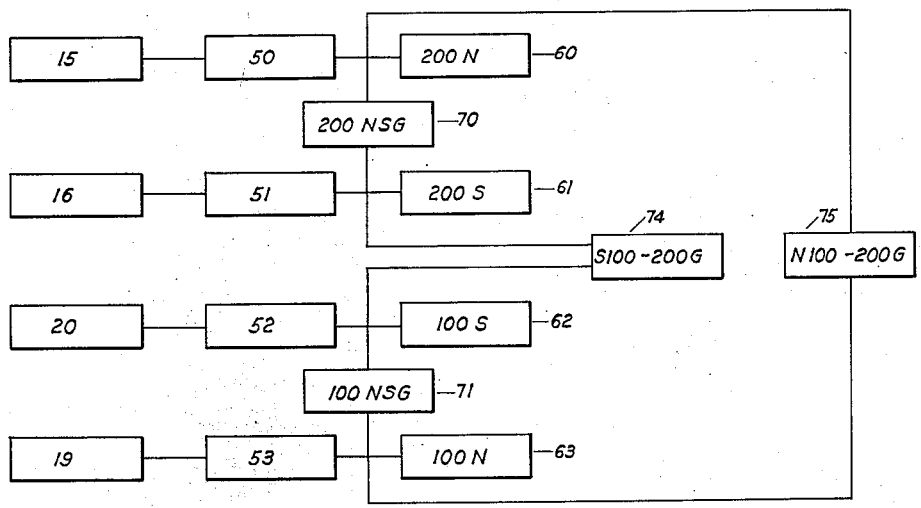
Figure 2:
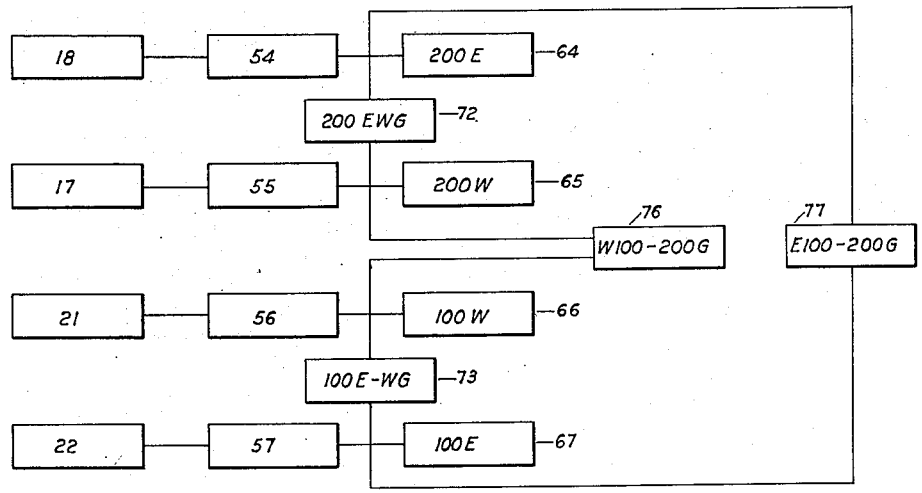

Other objects and advantages of the invention will become apparent from the following detailed description of a preferred embodiment of the invention wherein reference will be made to the accompanying drawings in which:

Figure 1 is a perspective view illustrating the method and apparatus of the invention, and Figure 2 is a schematic circuit diagram of the recording magnetic variometers used in the invention.

Referring to Figure 1, there is shown a slow speed low flying aircraft in the form of a blimp 10. Suspended from the bow, stern, port and starboard sides of the blimp are suspension means such as flexible cables or rigid tubes 11, 12, 13 and 14 carrying birds 15, 16, 17 and 18 at one level and birds 19, 20, 21 and 22 at another level. Each bird is a streamlined housing containing a self-orienting flux gate magnetic variometer such as described in "Airborne Magnetometers for Search and Survey" by Felch et al., A. I. E. E. technical paper 47—104, December 1946. Associated with each suspension means are electric conductors connecting each bird to electrical apparatus on the blimp.

For purpose of illustration the blimp is assumed to be flying on a northerly course at an altitude of three hundred feet and the lengths of the cables are such that the upper level of birds is at a two hundred foot altitude and the lower level of birds at a one hundred foot altitude. The ground beneath the blimp is illustrated as having numerous artificial structures having magnetic properties such as the steel derricks 30—31 of oil wells, electric transmission line 32—33 and the supporting towers 34—35 therefor, steel quonset building 36, oil pipe lines 37—38 from Christmas tree 39. A possible local subsurface condition is indicated in section as comprising a weakly magnetic stratum 40 of gradually increasing thickness, a non-magnetic layer 41, a strongly magnetic stratum 42 faulted at 43 and uplifted at 44, deeper formations 45, and a basement complex 46. Neither the vertical nor horizontal distance in Figure 1 is drawn to scale.

Referring to Figure 2, there are are shown schematically the birds 15—22 whose outputs are each connected to amplifiers, rectifiers and compounders indicated at 50—57 to produce indications of the variations of field strength as measured by the flux gates carried by the birds. These circuits may be of the type shown in detail in the aforementioned article by Felch et al. The outputs of these electric circuits are connected to recording instruments 60—67 which record respectively in the case of the blimp flying as in Figure 1 the variations in the total field intensity at the following positions—200 foot level north, 200 foot level south, 100 foot level south, 100 foot level north, 200 foot level east, 200 foot level west, 100 foot level west, and 100 foot level east. In addition the outputs of the separate circuits are interconnected to compounder recorders 70—77 which record respectively the variations in the components of magnetic field gradient as follows: 200 foot level north south, 100 foot level north south, 200 foot level east west, and 100 foot level east west gradients; south 100–200 foot, north 100–200 foot, west 100–200 foot, east 100–200 foot gradients. The first four gradients are horizontal gradients. The latter four gradients are near vertical gradients, the inclination depending on the angle of the suspension means between the two levels of birds. If desired separate suspension means can be used for the two levels so as to enable the lower birds to be directly beneath the upper ones. If rigid tubing is used for the suspension means a like result can be achieved with one suspension means for each pair of birds.

According to the method of the invention, a blimp or other lighter-than-air craft equipped as above described with a plurality of self-orienting flux gate magnetic variometers carried at horizontally and vertically spaced locations and connected through suitable electric circuits to instruments for recording the variations in total field intensity and various components of field gradient is flown at low speed and low altitude over the region where a surface micromagnetic survey is desired to determine variations caused by local changes in the subsurface formation. Since the magnetic effect at a point decreases approximately in proportion to the five halves power of the distance from the source of magnetic disturbance, it will be apparent that the effects of minor local disturbances due to artificial structures or topographic effects if the layer is magnetic will be greatly lessened by carrying the instruments slightly above ground level, for raising the level of the instruments a hundred feet or so above the ground will increase by a large percentage the distance from neighboring artificial structures and magnetic topography that would disturb a ground level survey while the distance from the subsurface structurally disturbed magnetic bed which it is desired to detect will be increased by a smaller percentage.

The aircraft must be flown at low speed in order that the recording and other mechanical instruments be able to follow quick changes. Photographic or other non-mechanical recording and other apparatus such as used for example in recording oscilloscopes may be used to avoid this limitation, but the speed must still be fairly slow due to air resistance of the suspension means. The aircraft must be flown at low level because of practical limitations of weight and stability upon the length of the suspension means. A lighter-than-air craft such as a blimp is presently the only practical equipment for flying at such low speed at near ground level.

It will be noted that the method is something of a compromise between the known methods of ground level micro-magnetic surface survey showing variations due to local subsurface changes and highly accurate airborne high altitude magnetic survey showing variations due to regional subsurface changes. If the instrument is at ground level, artificial structures and topographical effects influence the results. If the instrument is at a high level, not even the natural subsurface local structures influence the results. By carrying the instruments at a low level of within a few hundred feet just high enough to minimize the effect of local artificial structures and topographic effects which usually are not over fifty or a hundred feet in height and may in the case of pipes be a few feet below the ground, the desired undisturbed surface micromagnetic survey is obtained, a result not obtained by previously known methods. The use of a blimp or other lighter-than-air craft as distinguished from an airplane is the key to safe and successful accomplishment of such slightly above ground level surface surveys.

As above set forth, one of the principal new results of the invention is achieved by carrying the instruments at a low level with an aircraft. This result can be obtained with a single instrument so carried. But the invention further contemplates the use of a plurality of instruments at different levels. By a comparison of the records simultaneously produced from different levels and by examination of the records of the field gradients it will be possible to determine the level at which a structure, stratigraphic change, or deposit of ore producing a disturbance is located. This will not only enhance the ability of the method to segregate the effects of artificial structures and magnetic topography but will enable the depths of natural subsurface magnetically disturbed beds to be estimated. And by comparing the records produced by instruments at the same level but spaced apart it will be possible to determine the direction of a source of magnetic disturbance. It is to be noted that the simultaneity of the records at different levels and positions is important because of time variations in the earth's field and in the response of the instruments themselves to a field of given strength, and further to provide perfect space correlation between records produced at different points which would be impossible to attain with airborne instruments carried in separate aircraft or in the same aircraft at different times at different levels and/or horizontal locations.

While a preferred embodiment of the invention has been illustrated and described, it will be obvious that many changes can be made therein by one skilled in the art without departing from the spirit of the invention. Thus, other types of magnetic measuring instruments might be substituted for flux gates and the instruments might be read periodically instead of recording their indications continuously. Also, the speed of the aircraft can be varied according to the time response of the recording and other instruments used. The flux gates can be oriented with respect to the earth's magnetic field or gravitational field or relative to any other reference.

It is intended to protect by Letters Patent all forms of the invention falling within the scope of the appended claims.

I claim:

In the art of prospecting for subsurface materials by the detection of magnetic field anomalies indicative of local subsurface structures and faults constituting possible traps for oil and gas and other such anomalies associated with ferrous deposits and with deposits of other ores and minerals, the method which comprises making a continuous micromagnetic survey of the earth's field intensity along a line at a level of about several hundred feet above the earth's surface where the effects of artificial structures and topographical effects are reduced and the effects of local subsurface formation changes are apparent and making a second continuous micromagnetic survey of the earth's field intensity correlated with the first survey as to space and time, said second survey being conducted along a line in substantially the same vertical plane as the line of the first said survey and at a level spaced above the level at which the other survey is conducted by a substantially fixed distance of the same order of magnitude as the distance from the earth's surface of the first said survey level where the effects of artificial structures and topographical effect will be greatly reduced compared to the effect at the level of the first said survey and the effects of local subsurface changes will be of the same order of magnitude as at the level of the first said survey, the field intensity measurements of the second survey at each successive point along the line of the second survey being made substantially simultaneously with the field intensity measurements of the first survey at points directly vertically below those of the second survey.

WILLIAM P. JENNY.

References Cited in the file of this patent

UNITED STATES PATENTS

| Number | Name | Date |
| --- | --- | --- |
| 2,404,806 | Lindsey | July 30, 1946 |
| 2,415,808 | Buckley | Feb. 18, 1947 |
| 2,424,772 | Rieber | July 29, 1947 |
| 2,519,094 | Zuschlag | Aug. 15, 1950 |
| 2,520,677 | Fearon | Aug. 29, 1950 |
| 2,549,845 | Mouzon | Apr. 24, 1951 |
| 2,559,586 | Bjarnason | July 10, 1951 |
| 2,560,132 | Schmitt | July 10, 1951 |

OTHER REFERENCES

"Engineering & Mining Journal," Dec. 1935, pp. 609–610.

"Geophysics," July 1946, pp. 321–334.

Bell Laboratory "Record," pp. 142–145, April 1947.